US010129153B2

(12) United States Patent
Caulfield et al.

(10) Patent No.: US 10,129,153 B2
(45) Date of Patent: *Nov. 13, 2018

(54) IN-LINE NETWORK ACCELERATOR (71) Applicant: Microsoft Technology Licensing, LLC, Redmond, WA (US)

(72) Inventors: Adrian Caulfield, Seattle, WA (US); Eric Chung, Woodinville, WA (US); Doug Burger, Bellevue, WA (US); Derek Chiou, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,925

(22) Filed: May 15, 2017

(65) Prior Publication Data

US 2017/0250914 A1  Aug. 31, 2017

Related U.S. Application Data

(63) Continuation of application No. 14/752,734, filed on Jun. 26, 2015, now Pat. No. 9,674,090.

(51) Int. Cl.
*H04L 12/801* (2013.01)
*H04L 29/06* (2006.01)
*H04L 12/803* (2013.01)
*H04L 12/26* (2006.01)
*H04L 12/833* (2013.01)

(52) U.S. Cl.
CPC .......... *H04L 47/122* (2013.01); *H04L 43/026* (2013.01); *H04L 43/0882* (2013.01); *H04L 47/12* (2013.01); *H04L 47/31* (2013.01); *H04L 69/16* (2013.01)

(58) Field of Classification Search
None
See application file for complete search history.

(56) References Cited

U.S. PATENT DOCUMENTS 6,625,118 B1  9/2003  Hadi Salim et al.
7,143,159 B1  11/2006  Grace et al.
(Continued)

OTHER PUBLICATIONS

"International Preliminary Report on Patentability Issued in PCT Application No. PCT/US2016/039141", dated Sep. 12, 2017, 10 Pages.

(Continued)

*Primary Examiner* — Eunsook Choi (57) ABSTRACT

A smart NIC (Network Interface Card) is provided with features to enable the smart NIC to operate as an in-line NIC between a host's NIC and a network. The smart NIC provides pass-through transmission of network flows for the host. Packets sent to and from the host pass through the smart NIC. As a pass-through point, the smart NIC is able to accelerate the performance of the pass-through network flows by analyzing packets, inserting packets, dropping packets, inserting or recognizing congestion information, and so forth. In addition, the smart NIC provides a lightweight transport protocol (LTP) module that enables it to establish connections with other smart NICs. The LTP connections allow the smart NICs to exchange data without passing network traffic through their respective hosts.

18 Claims, 6 Drawing Sheets

(56) References Cited

U.S. PATENT DOCUMENTS

| | | | |
|---|---|---|---|
| 7,627,684 B2 | 12/2009 | Boucher et al. | |
| 7,873,817 B1 | 1/2011 | Aloni et al. | |
| 8,055,895 B2 | 11/2011 | Buer et al. | |
| 8,644,157 B2 | 2/2014 | Jagadeeswaran et al. | |
| 2001/0032269 A1* | 10/2001 | Wilson | H04L 47/10 709/235 |
| 2001/0037406 A1 | 11/2001 | Philbrick et al. | |
| 2002/0107949 A1 | 8/2002 | Rawson et al. | |
| 2006/0075480 A1 | 4/2006 | Noehring et al. | |
| 2006/0203730 A1* | 9/2006 | Zur | H04L 47/10 370/235 |
| 2006/0253622 A1* | 11/2006 | Wiemann | H04L 29/06 710/52 |
| 2007/0064737 A1 | 3/2007 | Williams | |
| 2008/0155069 A1 | 6/2008 | Kunhappan et al. | |
| 2009/0094399 A1 | 4/2009 | Daniel et al. | |
| 2010/0223390 A1 | 9/2010 | Marcondes et al. | |
| 2014/0059170 A1* | 2/2014 | Gasparakis | H04L 69/321 709/217 |
| 2014/0064294 A1 | 3/2014 | Deisinger et al. | |
| 2014/0207930 A1 | 7/2014 | Benny | |
| 2014/0254594 A1 | 9/2014 | Gasparakis et al. | |
| 2014/0301197 A1 | 10/2014 | Birke et al. | |
| 2014/0348118 A1 | 11/2014 | Zhang et al. | |
| 2015/0055661 A1 | 2/2015 | Boucher et al. | |
| 2015/0163117 A1 | 6/2015 | Lambeth et al. | |

OTHER PUBLICATIONS

"Non-Final Office Action Issued in U.S. Appl. No. 14/752,734", dated Oct. 26, 2016, 10 Pages.

"Notice of Allowance Issued in U.S. Appl. No. 14/752,734", dated Jan. 31, 2017, 5 Pages.

"Corrected Notice of Allowability Issued in U.S. Appl. No. 14/752,734", dated May 26, 2017, 4 Pages.

Covington, et al., "A Packet Generator on the NetFPGA Platform", In Proceedings of 17th IEEE Symposium on Field Programmable Custom Computing Machines, Apr. 5, 2009, 4 Pages.

"International Search Report and Written Opinion Issued in PCT Application No. PCT/US2016/039141", dated Sep. 29, 2016, 11 Pages.

"Second Written Opinion Issued in PCT Application No. PCT/US2016/039141", dated Jun. 14, 2017, 10 Pages.

* cited by examiner

IN-LINE NETWORK ACCELERATOR

RELATED APPLICATIONS

This application is a continuation patent application of copending application with Ser. No. 14/752,734, filed Jun. 26, 2015, entitled "IN-LINE NETWORK ACCELERATOR", which is now allowed. The aforementioned application(s) are hereby incorporated herein by reference

BACKGROUND

Data networking involves hardware and software. On the software side, networking protocols are often designed for current or near-term hardware capabilities. Protocols often become widely adapted while at the same time networking hardware improves. Processors become more efficient and capable and communication mediums gain reliability and capacity. Over time, networking protocols designed in the past may become less suitable for the hardware that is available in the present. For example, a transport protocol might have mechanisms for ensuring reliability, responsiveness to congestion, and ordered delivery. Such mechanisms are often not well suited for new types of networks. Yet, to maintain continuous inter-network operability, older protocols are not practical to modify. There is a need for techniques that can translate advances in networking technology into improvements in the overall performance of possibly older protocols without having to change those protocols or their existing implementations.

Moreover, some capabilities of networking hardware have not been fully appreciated and realized. So-called smart NICs (Network Interface Cards), for example FPGA (Field Programmable Gate Array) NICs have become more common. These newer interfaces, like traditional NICs, provide physical and media connectivity. They also include additional processing capability, sometimes in the form of reconfigurable circuitry (e.g., FPGAs). These processing-augmented NICs may allow features of some protocols to be offloaded from the host's CPU (Central Processing Unit) to the NIC. Some smart NICs may even allow an entire transport protocol to be fully offloaded from a host's CPU to the smart NIC. However, this approach often requires significant host-side changes. For example, host-side software might need to be re-written to communicate directly with its NIC via a custom application programming interface (API) rather than via a standard transport protocol. In addition, most smart NICs with off-load functionality do not function as "bump in the line" ("in-line") devices (i.e., devices that connect to a host's existing NIC). Thus, to upgrade a host from an ordinary NIC to a smart NIC, the host's ordinary NIC must be physically replaced with a new smart NIC. Large scale upgrades can be expensive and disruptive. There is a need for smart NICs that can be provided to hosts to improve network and host performance without necessarily requiring host-side software or hardware changes.

Moreover, as realized only by the inventors, the development of smart NICs has also made it possible to off-load application-level functionality to smart NICs. For example, a distributed application might have elements throughout a data center that need to exchange data. Some of those elements or their helper agents might be capable of being executed by a smart NIC. However, it has not been realized that application-level code (or other code) on in-line smart NICs might be capable of direct network communication without having to traverse their respective hosts and host network stacks.

Techniques related to the issues mentioned above are described below.

SUMMARY

The following summary is included only to introduce some concepts discussed in the Detailed Description below. This summary is not comprehensive and is not intended to delineate the scope of the claimed subject matter, which is set forth by the claims presented at the end.

A smart NIC (Network Interface Card) is provided with features to enable the smart NIC to operate as an in-line NIC between a host's NIC and a network. The smart NIC provides pass-through transmission of network flows for the host. Packets sent to and from the host pass through the smart NIC. As a pass-through point, the smart NIC is able to accelerate the performance of the pass-through network flows by analyzing packets, inserting packets, dropping packets, inserting or recognizing congestion information, and so forth. In addition, the smart NIC provides a lightweight transport protocol (LTP) module that enables it to communicate directly with other smart NICs without passing network traffic through their respective hosts.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments described below relate to in-line smart NICs accelerating network flows of hosts for which they provide network connectivity. Embodiments described below also relate to enabling direct inter-NIC network communication. Technical details that support and enhance these features are also described below.

Figure 1:
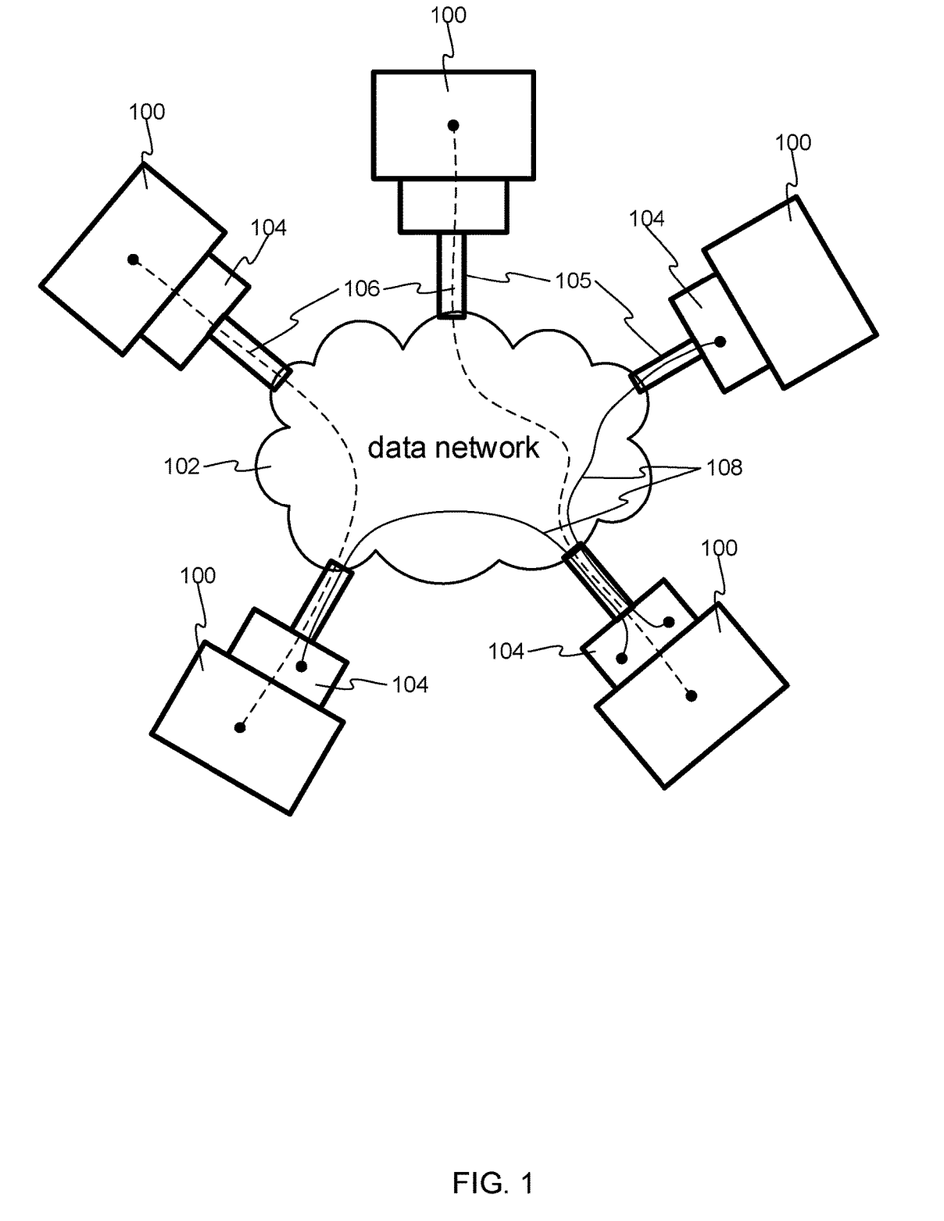
FIG. 1 shows hosts arranged to communicate with each other via a data network.

FIG. 1 shows hosts 100 arranged to communicate with each other via a data network 102. The hosts 100 may be any type of computing device that can operate as network flow endpoints. The form of a host 100 is not important (e.g., a blade, server, workstation, laptop, etc.), but processing hardware (e.g., a CPU, graphics processing units, etc.), storage hardware (e.g., memory, disk drives, etc.), and hardware for their cooperation (buses, input/output controllers and ports, etc.) are assumed. For purposes herein, details of the data network 102 are not significant. For example, the data network 102, at the physical/link level, might include segments of shared medium (e.g., Ethernet), one or more switched fabrics (e.g. Infiniband or switched-fabric fibre channel), token rings, etc. Any type of known data network 102 capable of providing network-level routing between the hosts 100 or other devices may be used. For discussion, the data network 102 will be assumed to be an Internet Protocol (IP) network that provides IP routing for the hosts 100, which have respective IP addresses assigned to them.

The hosts 100 are provided with respective smart NICs 104. The hosts 100 may have their own NICs (not shown), and the smart NICs 104 (which may also be referred to as "in-line NICs") are configured to intermediate network flows 106 between the host NICs and the data network 102. The network flows 106 can be Transmission Control Protocol (TCP)) flows, for example. The smart NICs 104 are able to exchange network packets with the data network 102 via media/physical links 105 and are able to exchange network packets with their respective hosts 100 via media/physical links (not shown) to the host NICs. As shown in FIG. 1, hosts 100 are able to communicate with each other (and other nodes) using the intermediated network flows 106. In short, a smart NIC 104 of a host 100 will intermediate packets of network flows 106 that terminate at the host 100. As described further below, the type of intermediation provided by a smart NIC 104 can range from basic pass-through logic that does not attempt to affect its network flows 106 to pass-through logic capable of improving the performance of its network flows 106.

As will also be described further below, the smart NICs 104 may implement a lightweight transport protocol (LTP). The LTP is a connection-oriented protocol that provides reliability and ordering with low overhead. As shown in FIG. 1, LTP connections 108 begin and end at the smart NICs 104 and thus provide a form of inter-NIC communication that does not burden the hosts 100, since the hosts 100 do not receive or otherwise handle LTP packets. The smart NICs 104 are able to, at their own initiative, (i) open and close LTP connections 108, (ii) generate LTP packets, and (iii) send and receive LTP packets via the LTP connections 108.

Figure 2:
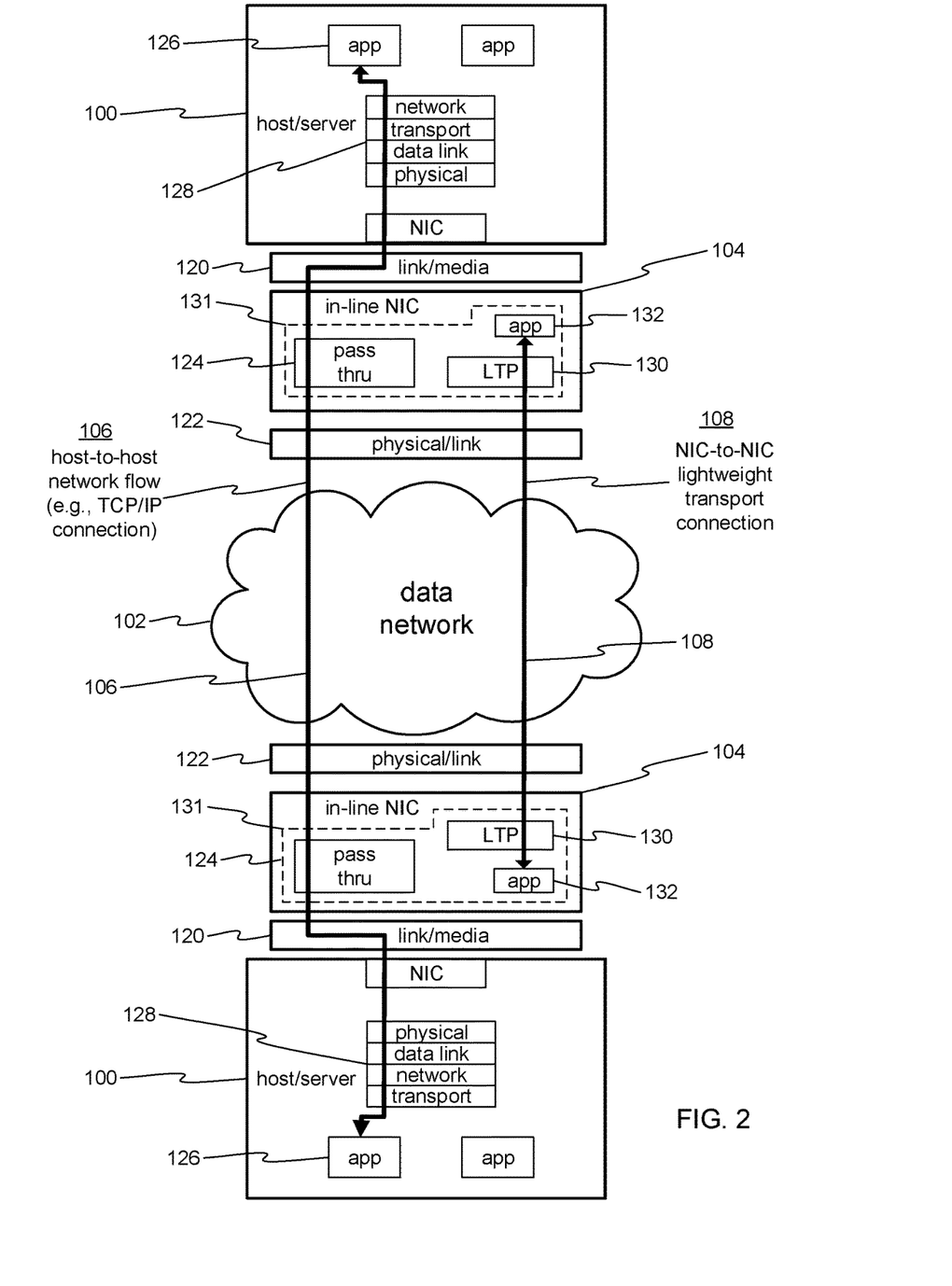
FIG. 2 shows high level features of an in-line smart NIC.

FIG. 2 shows high level features of an in-line smart NIC 104. As mentioned above, a smart NIC 104 may be arranged in-line between a host 100 and the data network 102 (as used herein "in-line" is a term used to identify a type of smart NIC and does not imply that such a NIC is presently connected to a host and network). In particular a smart NIC 104 may have a first physical/link connection 120 physically connecting the smart NIC 104 with its host 100. The smart NIC also has a second physical/link connection 122 connecting to the data network 102. The physical/link connections may each be any type, for instance Ethernet, Fibre Channel, InfinBand, etc. A physical/link connection may also be a wireless medium. As discussed with reference to FIG. 3, the smart NIC is provided with media access controllers (MACs) to interface with the physical/link connections 120, 122.

To facilitate pass-through intermediation of network flows 106, the smart NICs 104 are provided with one or more pass-through components 124. A pass-through component 124 provides store-and-forward buffering of flow packets. A pass-through component 124 may also include logic to improve the performance of the flows that it is handling. As described further below, a pass-through component 124 can use a variety of factors to improve a flow's performance, including, for example, explicit congestion notifications (ECNs), classifications of flows (e.g. lossy and lossless), information about the state of the network 102, features of the flows themselves, etc. As also described below, a variety of actions may be taken to affect the behavior of flows, such as inserting packets into flows, inserting priority flow control (PFC) markers into flow packets, pausing or throttling flows, random early dropping (RED) of flow packets, etc.

A network flow 106 used by applications to exchange data may pass through a smart NIC as follows. A host-based application 126 (any application-layer code on a host 100) has data to convey. The data is passed through an operating system API/facility (e.g., a stream or socket) to a network stack 128, where the data is placed in transport packet(s) (e.g., TCP packets), which are encapsulated in network packet(s) (e.g., IP packets with the host's IP address as the sender), which are in turn placed in the payload(s) of physical layer frames (e.g., Ethernet frames). The frames are passed through the first physical/link connection 120 to the smart NIC 104. The smart NIC 104 strips the network frames, stores the transport packets, and optionally checks the IP and/or transport packets for features such as ECN markers, stream-classification flags, etc. When buffered packets are ready to be sent, the smart NIC encapsulates them in an IP packet with the same source and destination addresses as the IP packets received from the host. The IP packets are then framed for the second link/media connection 122 and transmitted thereon. In effect, the IP packets transmitted by the smart NIC to the data network are generally the same as those originally received from the host.

Flow packets received by a smart NIC from the data network 102 are generally forwarded to the host in the same fashion, and the host's network stack 128 similarly provides the application data to the host-based application 126. Notably, the in-line arrangement of the smart NIC and the bi-directional pack passing of packets allows a smart NIC and its host to use the same IP address. This can allow the host's smart NIC to be added or removed transparently to the host and to the routing of the data network. As discussed further below, LTP packets can also use the hosts' IP addresses as source and destination addresses for IP routing, even though the LTP packets are not sent or received by the hosts.

To facilitate inter-NIC LTP connections 108, smart NICs 104 may be provided with respective LTP modules 130. The LTP modules 130 implement the LTP. An LTP module 130 receives a request from a NIC-based application 132 to send data. The NIC-based application 132 can be any type of code. For instance, the NIC-based application 132 might be an application that supports the cooperation between smart NICs. The NIC-based application might be part of a distributed application that, through other means, shares data with a host-based application. In one embodiment, the smart NICs have a bus interface to connect with a host bus (e.g., a Peripheral Component Interconnect Express bus). Software on the host can send data through the bus to its smart NIC. An agent on the smart NIC interacts with the local LTP module 130 by: requesting a connection to a remote LTP module (the request specifying the destination network address, and providing data to the LTP module 130, which in turn packetizes the data into LTP packets and manages transmission of the LTP packets, as per the LTP, to the remote LTP module. In one embodiment, the LTP connections 108 are one-way (not bi-directional). In another embodiment, the LTP packets used by the LTP modules 130 are UDP (Universal Datagram Protocol) packets that are ultimately routed in IP packets. As described below, a smart NIC 104 can include an FPGA 131 or other form of programmable logic device. The FPGA 131 can be configured to implement the LTP module 130, the pass-through components 124, the NIC-based application 132, or other elements of a smart NIC.

Figure 3:
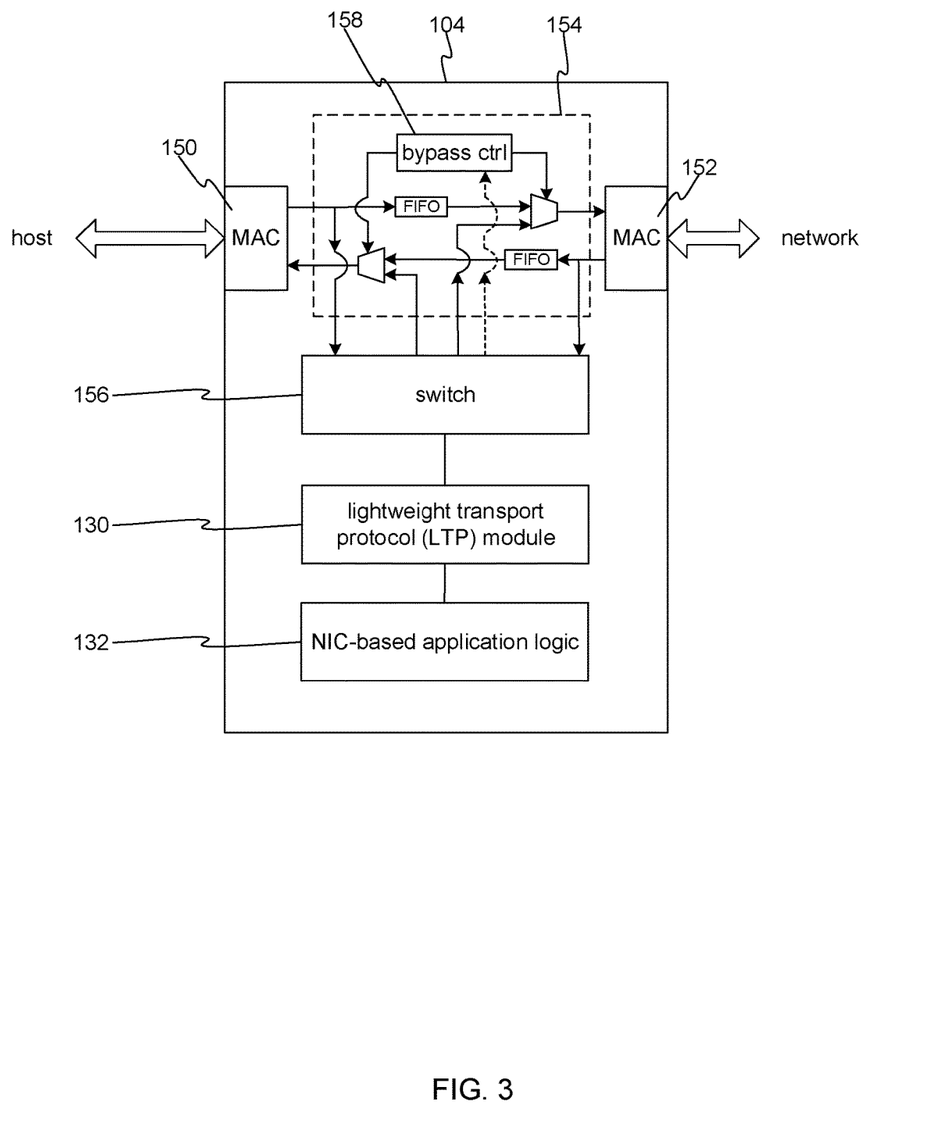
FIG. 3 shows another view of a smart NIC.

FIG. 3 shows another view of a smart NIC 104. The smart NIC 104 includes a first MAC 150, a second MAC 152, a bypass module 154, a switch 156, the LTP module 130, and a NIC-based application 132. The bypass module 154 can implement basic "dumb" pass-through handling of flow packets for the smart NIC. The switch 156 can extend the pass-through handling to include flow-processing functions such as injecting packets into flows, removing packets from flows, altering flow behavior, etc.

The bypass circuit 154 allows the smart NIC 104 to function as a basic bridge under conditions when flow processing might not be available. For instance, when the smart NIC is in a certain state such as a booting state, a resetting state, an error state, etc. A bypass control 158 can be signaled to cause the MACs 150, 152 to either communicate directly via their respective FIFO buffers, or indirectly by passing packets through the switch 156 for in-line processing. The switch 156 can also signal the bypass control 158 (see dashed line from switch 156 to bypass control 158).

More specifically, the smart NIC may include error checking facilities to determine if the bypass should be triggered. If an error condition is detected then the bypass mode is entered. Detectable conditions might be: a packet is being transmitted that doesn't have data ready (data stuttering), two end-of-packet flags occur without a start-of-packet flag between them, or two start-of-packet flags occur without an end-of-packet flag between them.

In addition to the above fixed conditions, the smart NIC can track packet ingress and egress counts on both MACs and can provide configurable minimum packets-per-interval levels that can indicate error conditions. The ingress/egress counters can be used to determine if traffic in either direction through the smart NIC has ceased to flow, or if internally produced traffic has stopped.

Figure 4:
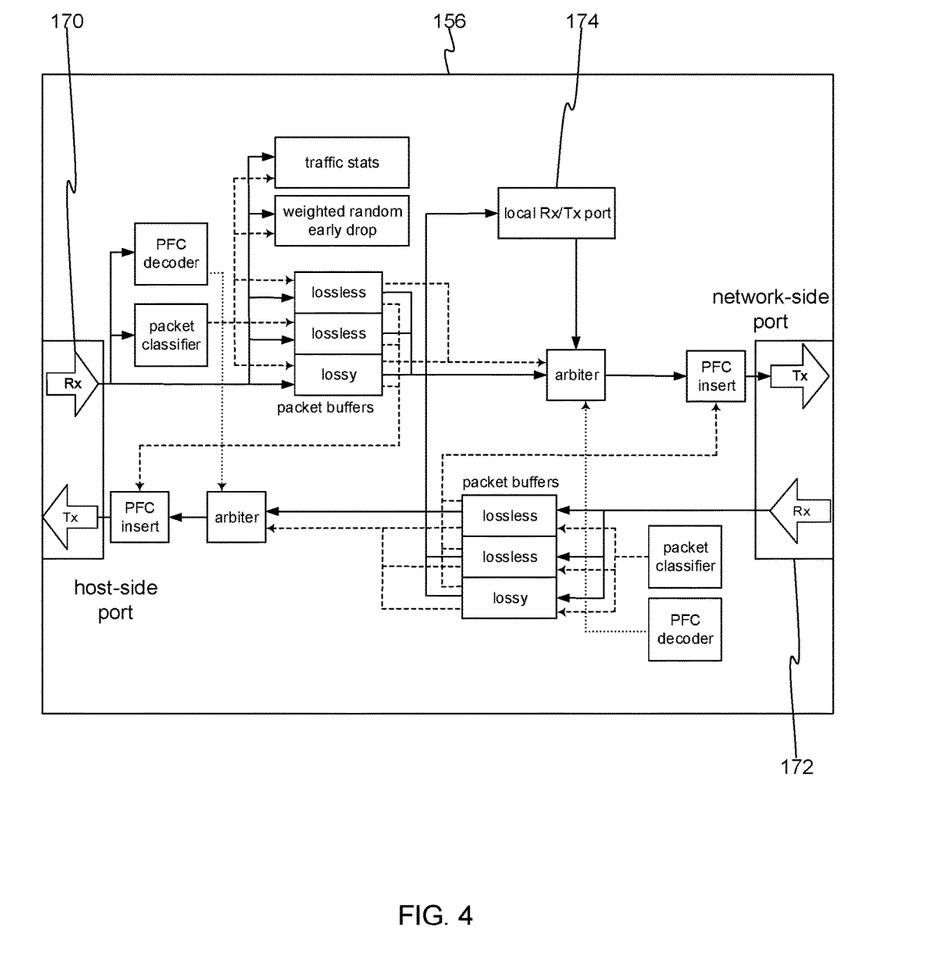
FIG. 4 shows details of a switch.

FIG. 4 shows details of the switch 156 (solid lines represent data paths, and dashed lines represent control signals). The switch 156 provides features to allow the smart NIC 104 to add packets to outgoing network-bound flows and to prevent LTP packets from being sent on to the host system. If the data network 102 supports several lossless classes of traffic, the switch 156 can be configured to provide sufficient support to buffer and pause incoming lossless flows to allow it to insert its own traffic into the network. To support that, the switch 156 can be configured to distinguish lossless traffic classes (e.g., Remote Direct Memory Access (RDMA)) from lossy (e.g., TCP/IP) classes of flows. A field in a packet header can be used to identify which traffic class the packet belongs to.

The switch 156 has a first port 170 (host-side) to connect to the first MAC 150, and a second port 172 (network-side) to connect to the second MAC 152. A third local port 174 provides internal service to the smart NIC, for example, to the LTP module 130. This port can apply backpressure if needed. The switch 156 may generally operate as a network switch, with some limitations. Specifically, the switch 156 may be configured to pass packets received on the local port 174 (e.g., LTP packets) only to the second port 172 (not the first port 170). Similarly, the switch 156 may be designed to not deliver packets from the first port 170 to the local port 174.

Internally, the switch 156 has two packet buffers; one for the receiving (Rx) first port 170 and one for the receiving second port 172. The packet buffers are split into several regions. Each region corresponds to a packet traffic class. As packets arrive and are extracted from their frames (e.g., Ethernet frames) they are classified by packet classifiers into one of the available packet classes (lossy, lossless, etc.) and written into a corresponding packet buffer. If no buffer space is available for an inbound packet then the packet will be dropped. Once a packet is stored and ready to transmit, an arbiter selects from among the available packets and transmits the packet (the packet may be framed by the switch 156 or another element of the smart NIC). A PFC insertion block allows the switch 156 to insert PFC frames between flow packets at the transmit half of either of the ports 170, 172.

The switch 156 can handle a lossless traffic class as follows. All packets arriving on the receiving half of the first port 170 and on the receiving half of the second port 172 should eventually be transmitted on the corresponding transmit (Tx) halves of the ports. Packets are store-and-forward routed. Priority flow control (PFC) can be implemented to avoid packet loss. For lossless traffic classes, the switch 156 may generate PFC messages and send them on the transmit parts of the first and second ports 170, 172. In one embodiment, PFC messages are sent when a packet buffer fills up. When a buffer is full or about to be full, a PFC message is sent to the link partner requesting that traffic of that class be paused. PFC messages can also be received and acted on. If a PFC control frame is received for a lossless traffic class on the receive part of either the first or second port 170, 172, the switch 156 will suspend sending packets on the transmit part of the port that received the control frame. Packets will buffer internally until the buffers are full, at which point a PFC frame will be generated to the link partner.

The switch 156 can handle a lossy traffic class as follows. Lossy traffic (everything not classified as lossless) is forwarded on a best-effort basis. The switch 156 is free to drop packets if congestion is encountered. Random Early Drops (REDs) can be implemented on the receive part of the first port 170. REDs can help cap host generated lossy traffic to a target bandwidth. Limiting host bandwidth ensures that when the smart NIC starts introducing its own traffic there will not be a corresponding sudden drop in available bandwidth, which would interact poorly with TCP/IP streams using the link. A control parameter can be provided to set the RED thresholds.

As can be seen from features of the switch 156, a smart NIC 104 is able to act as a throughput for its host while improving the performance of the host's flows. Signs of congestion can be detected in packets or flows before the packets traverse a host and its network stack. A smart NIC can react to those signs more quickly than the host. For example, if a congestion marker is detected in a packet on its way to the host, the smart NIC can quickly stop or start the flow, increase or decrease available bandwidth, throttle other flows/connections, etc., before effects of congestion start to manifest at the host. Moreover, congestion markers or the like can be removed from a flow before they reach the host, thus reducing the flow-handling load at the host. As a result, the host can run an ordinary network stack (e.g., TCP/IP) and many of the high-overhead features of that stack can remain dormant. For example, window size adjustments can be minimized or avoided, less packet buffering may be needed, handling of malformed or inconsistent packets may not be necessary (the smart NIC can intercept and remove such packets and possibly request retransmission), congestion signaling can become unnecessary at the host, the need for packet fragmentation or MTU adjustments, etc. Flow transformations such as compression, encryption, and flow tables can also be transparently assumed.

Before explaining the LTP module 130, it will be helpful to understand the function of the LTP and how it can be used. Smart NICs, in general, are ordinary NICs that are augmented with processing hardware that might not be needed for the minimal networking functions of a NIC. General purpose processors accompanied with appropriate software in static memory can be one form of processing hardware used to augment a NIC. Reconfigurable digital circuits are another form of processing hardware that are convenient due to their flexibility and speed. Such reconfigurable circuits, referred to herein as programmable logic devices (PLDs), can be FPGAs or known equivalents. NIC-based supplemental processing can also be provided with ASICs (application-specific integrated circuits), ASSPs (application-specific standard parts), SoCs (system on a chip), etc.

A smart NIC, in particular one with a PLD, can be configured to act as a thin autonomous node on a network. In one embodiment, a smart NIC can be configured with an environment or shell within which arbitrary processes or execution units can be instantiated. In any case, NIC-based application-level code (or hardware) can be advantageous due to close proximity to the network and lack of host-based burdens such as a complex network stack, interrupt handling, resource sharing, etc. In short, NIC-based applications may be able to communicate with latencies and throughputs close to the maximum possible on a network. Moreover, they may be capable of assured performance due to their use of dedicated hardware. As noted above, such NIC-based application code/circuitry can also cooperate with host-based software at high data rates if the smart NIC has a bus connection with the host. As can be seen, a smart NIC can itself be an agent of sorts that generates and consumes network traffic for its own purposes. To take advantage of a smart NIC's locales and processing capabilities, it can be advantageous to provide such smart NICs with their own mechanism or protocol for directly exchanging data via the data network.

Figure 5:
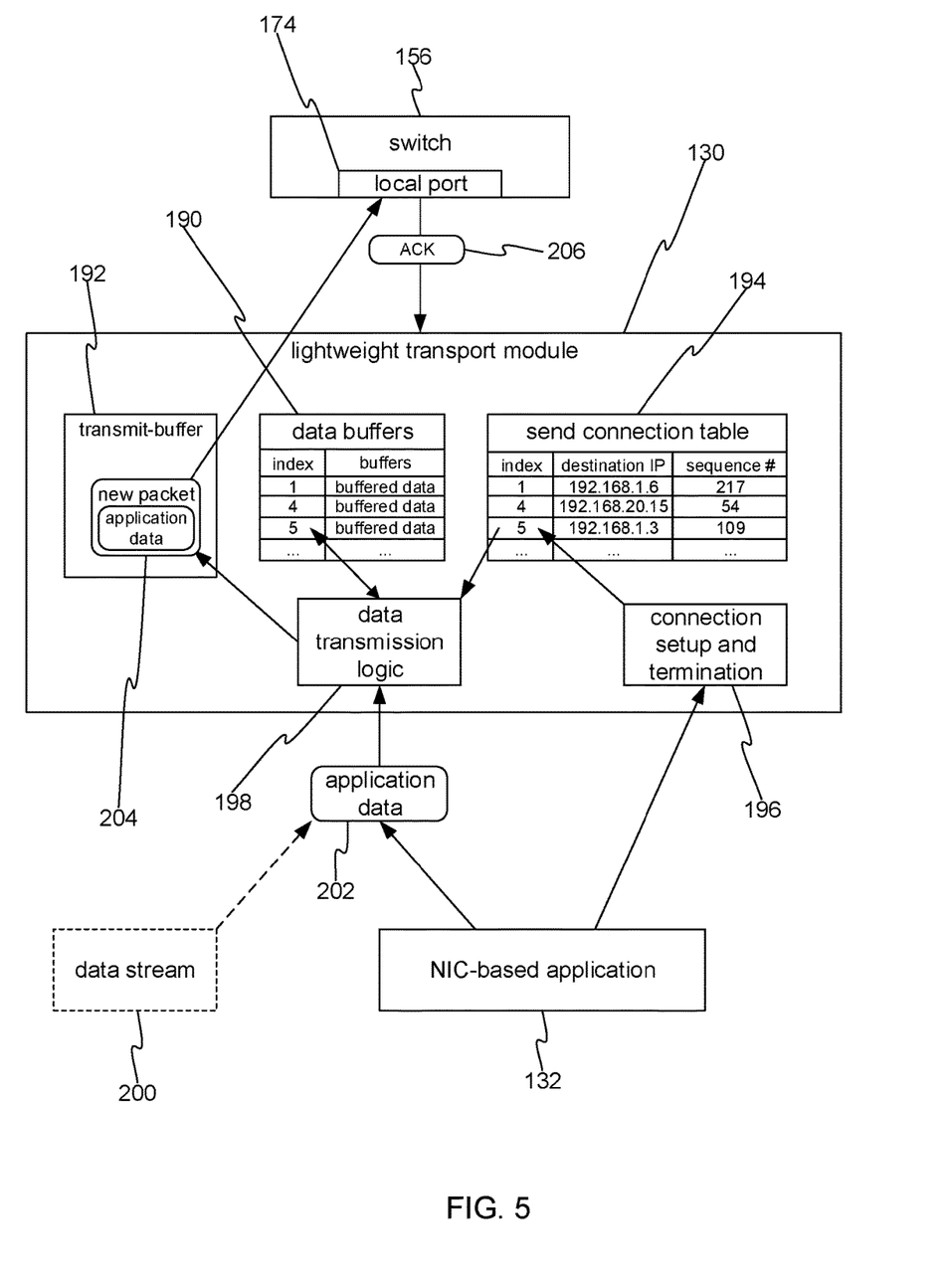
FIG. 5 shows details of a lightweight transport protocol (LTP) module.

FIG. 5 shows details of the LTP module 130. The LTP module 130 may include one or more data buffers 190 to buffer payload, a transmit buffer 192, a connection table 194, connection management logic 196, and data transmission logic 198. These elements can operate to provide efficient and reliable connection-based communication between smart NICs.

The connection management logic 196 provides an interface with which a NIC-based application 132 can open a connection. The application passes a destination network IP address to the connection management logic 196. The connection management logic 196 creates a new entry in the connection table 194. The entry includes an index or handle, the destination IP address, and the current sequence number for the connection (initially zero. An LTP connection request is then send to the destination IP. The recipient smart NIC responds by adding a corresponding entry in its connection table. In one embodiment, each smart NIC also maintains a receiving connection table for connections opened by other smart NICs. While not necessary, use of both send and receive connection tables can reduce overhead and possibly avoid explicit identification of one-way vs two-way communication between devices.

In one embodiment, the smart NIC may include facilities for providing and managing streams or virtual channels for applications. In this embodiment, the application's connection request may also specify or associate a stream 200 with the requested connection. Data from the stream is then automatically passed to the connection as it becomes available. In another embodiment, the application itself passes data to its connection using the index/handle to specify the connection. A connection entry can be removed from the connection table 194 either by an explicit call from the application or by a monitor that removes connections that have no activity for a defined time period.

Figure 6:
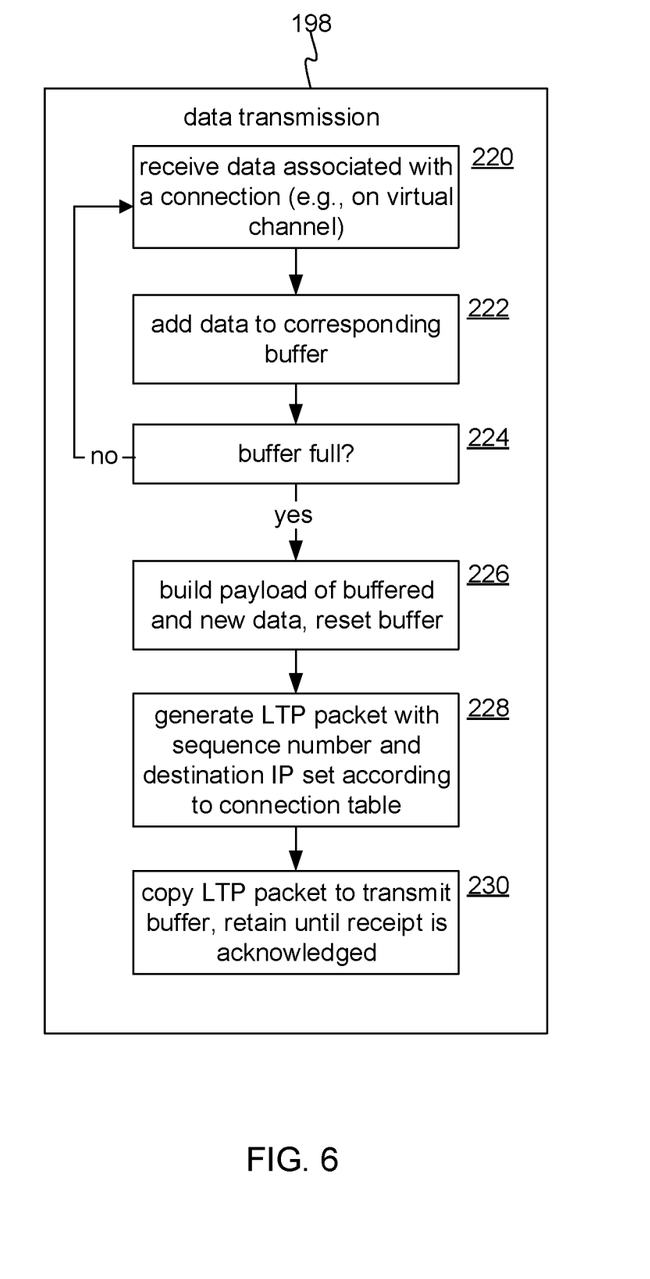
FIG. 6 shows a process for transmitting application LTP data.

FIG. 6 shows a process for transmitting application data 202 performed by the data transmitting logic 198. As noted above, application data 202 is passed to the LTP module 130 either directly from the application or from a stream 200 associated with the connection. In the former case, the application passes the application data 202 and the handle of the connection (e.g., index "5" in FIG. 5). At step 220, the application data is received, and at step 222 the incoming data is added to a corresponding buffer in the data buffer 190. At step 224 the buffer is checked. In one embodiment, the buffer is considered full when a next portion of data (or the current application data 202) would fill the buffer up to a size such as the maximum transmission unit (MTU) of the data network. In short, incoming application data that is to be transmitted it buffered until there is sufficient data to form an LTP packet. If step 224 determines that the buffer is not ready to transmit, then the data transmission logic 198 waits for additional application data. To allow small messages to be sent with lower latency, the LTP module 130 may also be configured to receive a flag or signal that indicates that the application data (e.g., a message) is complete, which will trigger transmission of an LTP packet.

Assuming that there is a sufficient amount of buffered data, at step 226 an LTP payload is formed from the buffered data and the buffer is reset (the incoming data is either included in the payload or in the empty buffer). At step 228 an LTP packet 204 is formed for the payload. The sequence number for the relevant connection is incremented in the connection table 194 and is added to the new LTP packet's header. The destination IP address is obtained from the appropriate entry in the connection table 194 and is added to the LTP packet's header. In one embodiment, the LTP packet 204 is formatted as a standard UDP packet. The UDP packet format is only a convenience, and the UDP standard itself need not be implemented. Because LTP packets are routed in IP packets and are parsed only by the smart NICs, any format may be used for the LTP. If the UDP packet format is used, a port number can be defined to identify LTP packets. In this way, the smart NIC can differentiate between LTP packets and UDP packets that are not LTP packets and therefore are to be passed through. LTP control/overhead packets such acknowledgment packets, connection setup and takedown packets, etc., are also formatted to be identifiable as LTP packets (e.g., UDP packets with a specific port number). Note that in one embodiment, the LTP module also forms the IP packets that will carry the LTP packets. That is, the switch receives a complete, well-framed, and formatted packet.

At step 230 the LTP packet 204 is copied to the transmit buffer 192 and then forwarded to the local port 174 of the switch 156, which frames and transmits the LTP packet 204 from the transmit part of its second port 172 (the network-facing port). The LTP module provides ordered reliable delivery. In one embodiment, acknowledgment (ACK) LTP packets 206 are transmitted to confirm receipt. Each LTP ACK includes the sequence number of the LTP packet being acknowledged. When an LTP packet is acknowledged, it can be removed from the transmit buffer 192. In one embodiment, negative acknowledgements (NAKS) and/or timeouts can be used to trigger retransmission of buffered LTP packets.

The LTP module 130 also handles incoming LTP packets. When packets arrive on the local port 174 from the switch 130, the LTP module 130 determines which entry in the connection table 194 pairs with the packet. If no matching entry exists the packet is dropped. The LTP module 130 checks that the incoming sequence number matches the expected value from the connection table 194 entry. If the sequence number is greater than the connection table entry, the packet is dropped. If the sequence number is less than expected, an LTP ACK is generated and the packet is dropped. If the incoming LTP packet's sequence number matches the entry in the connection table 194 then the packet's payload is unloaded and passed to an application or a stream associated with the connection (as the case may be). If the LTP module 130 is unable to pass off the payload data then the incoming LTL packet can be dropped. Once the incoming LTP packet has been accepted, an LTP ACK is generated and the sequence number for the connection is incremented in the connection table 194. In another embodiment, inbound LTP packets can be buffered to re-order out-of-order packets. Also a NACK may be generated when a dropped packet is detected (via a skipped sequence number, etc.).

Because the LTP traffic is handled by the switch 156, the LTP packets can be classified and managed in the same way that the packets of host-based network flows can be managed. LTP connections can therefore adhere to PFC stalls and ECNs, for instance. LTP traffic can also be provided with a bandwidth amount or a quality of service setting. Unused header space, if available, can be used to send ECN and/or QCN/DC (Quantized Congestion Notification with Delay-Based Congestion Detection) information.

The invention claimed is:

1. A network interface card (NIC) to handle network flows that conform to a transport protocol, the NIC comprising:
   a first interface for: connecting to a host bus, transmitting outbound first frames to the host via the bus, and receiving inbound first frames from the host via the bus;
   a second interface comprising a MAC for: connecting to a network via a physical media, passing outbound second frames to the network via the physical media, and receiving inbound second frames from the network via the physical media;
   processing hardware configured to provide transmission processing of packets of the network flows between the host and the network by:
   (i) generating the outbound second frames to contain packets from the inbound first frames, and storing the generated outbound second frames in a first buffer, (ii) generating the outbound first frames to contain packets from the inbound second frames, and storing the generated outbound first frames in a second buffer
   the processing hardware further configured to provide congestion control for the flows by:
   (i) monitoring the network flows on a per-flow basis to determine which flows are experiencing congestion, the monitoring comprising counting packet ingress and/or egress through the first and/or second buffers, and
   (ii) according to the monitoring perform congestion control actions on the flows determined to be experiencing congestion, the congestion control actions comprising one or more of: throttling the transmitting from the first and/or second buffers, originating congestion control messages and inserting the congestion control messages into the flows, or inserting congestion control indicators into the packets of the flows during the passthrough transmission processing.

2. A NIC according to claim 1, wherein the transport protocol comprises the Transmission Control Protocol (TCP), and wherein the host implements the transport protocol to handle the packets sent from the MAC.

3. A NIC according to claim 1, wherein the indicia of congestion comprises explicit congestion control (ECN) markers.

4. A NIC according to claim 1, wherein the monitoring the first and/or second buffers comprises counting ingress and egress of packets or frames to/from the first and/or second buffers.

5. A NIC according to claim 1, wherein the congestion control actions comprise removing congestion control markers from the network flows.

6. A NIC according to claim 1, wherein the congestion control actions comprise echoing a congestion marker and removing a corresponding congestion marker from a packet that is to be forwarded to the host.

7. A NIC according to claim 1, wherein the processing hardware is further configured to implement random early drops on packets of the network flows.

8. A NIC according to claim 1, wherein the congestion control actions comprise transmitting an Ethernet priority flow control (PFC) frame or an Ethernet pause frame.

9. A network interface card (NIC) to intermediate Internet Protocol (IP) flows between a host and a network, the NIC comprising:
   a first interface configured to connect to a bus of the host;
   a second interface comprising a media access controller (MAC);
   a control circuit configured to store and forward IP packets of the IP flows to the network and to the host by:
   (i) transmitting, from the first interface, first frames containing IP packets extracted from second frames received by the second interface, and by
   (ii) transmitting, from the second interface, third frames containing IP packets extracted from fourth frames received by the first interface; and
   wherein the control circuit is further configured to control the IP flows by monitoring the IP flows to detect congestion indicators and regulate transmission of packets of the IP flows according to the congestion indicators, wherein the control circuit is configured to regulate the transmission of packets by differentiating between classes of IP flows and regulate the IP flows according to their classes, wherein the classes include a lossy class and a lossless class, and wherein the control circuit is further configured to detect when a buffer of a lossless class of IP reaches a fullness level and in response transmit a flow control frame indicating that traffic on the lossless class of IP flow is to be paused.

10. A NIC according to claim 9, wherein the monitoring the IP flows comprises detecting congestion.

11. A NIC according to claim 10, wherein the detecting congestion comprises detecting a congestion marker inserted into an IP flow by the network, and wherein the regulating comprises throttling the IP flow.

12. A NIC according to claim 9, wherein the control circuit is configured to perform the monitoring of the IP flows by monitoring queues of the respective IP flows.

13. A NIC according to claim 9, wherein control circuit is further configured to detect when a first flow control frame is received on either the first interface or the second interface, determine which IP flow corresponds to the first flow control frame, and in response stop transmitting for the determined IP flow until a corresponding buffer is substantially full.

14. A NIC according to claim 13, wherein the control circuit is further configured to transmit a second flow control frame in response to determining that the buffer is substantially full, the second flow control frame configured to cause a remote node to resume transmitting for the determined IP flow.

15. A NIC according to claim 9, wherein the control circuit comprises, at least in part, a programmable logic device.

16. A method of regulating TCP/IP flows performed by a network interface card (NIC), the method comprising:
 receiving first TCP packets of the TCP/IP flows from a bus of the host and transmitting the first TCP packets to a network, the NIC comprising a media access controller (MAC) and a bus interface, the first TCP packets received through a connection between the bus interface of the NIC and the bus of the host;
 receiving second TCP packets of the TCP/IP flows from the network and transmitting the second TCP packets to the bus of the host, the second TCP packets received through a media connection between the MAC of the NIC and the network;
 based on the received first and second TCP packets, monitoring one or more features of the first and second TCP/IP flows and/or the first and second TCP packets; and
 identifying a TCP/IP flow based on a monitored feature of the TCP/IP flow having been determined to meet a condition, and based on the identifying of the TCP/IP flow, initiating an action to modify how the TCP/IP flow is transmitted and/or received, wherein the modifying comprises echoing a congestion marker and removing a corresponding congestion marker from a packet that is to be forwarded to the host.

17. A method according to claim 16, wherein the feature corresponds to congestion and the action addresses a cause of the congestion.

18. A method according to claim 17, wherein the monitoring comprises counting sent and received TCP/IP packets for a TCP/IP flow, and wherein the action comprises one or more of: modifying a received TCP/IP packet before transmitting the TCP/IP packet, inserting a packet into a TCP/IP flow, dropping a packet from the TCP/IP flow, or throttling the TCP/IP flow.

* * * * *